(12) United States Patent
Peleg et al.

(10) Patent No.: US 7,177,284 B2
(45) Date of Patent: Feb. 13, 2007

(54) INVERSE MULTIPLEXER DEVICE

(75) Inventors: Shimon Peleg, Hod-Hasharon (IL); Etan Shirron, Herzliya (IL)

(73) Assignee: Infineon Technologies AG, Munich (DE)

( * ) Notice: Subject to any disclaimer, the term of this patent is extended or adjusted under 35 U.S.C. 154(b) by 711 days.

(21) Appl. No.: 10/285,089

(22) Filed: Oct. 31, 2002

(65) Prior Publication Data
US 2003/0107999 A1    Jun. 12, 2003

Related U.S. Application Data

(63) Continuation of application No. PCT/EP00/04651, filed on May 22, 2000.

(51) Int. Cl.
*H04L 12/26* (2006.01)
*H04L 12/66* (2006.01)
*H04L 12/28* (2006.01)
*H04J 3/04* (2006.01)

(52) U.S. Cl. .................. 370/252; 370/356; 370/395.1; 370/536

(58) Field of Classification Search ............. None
See application file for complete search history.

(56) References Cited

U.S. PATENT DOCUMENTS 5,617,417 A    4/1997  Sathe et al.
5,754,120 A *  5/1998  Argentati .................. 340/2.22
6,002,670 A * 12/1999  Rahman et al. ............ 370/238
6,222,858 B1 * 4/2001  Counterman ............... 370/474
6,580,727 B1 * 6/2003  Yim et al. .................. 370/463
6,647,058 B1 * 11/2003 Bremer et al. .............. 375/222

FOREIGN PATENT DOCUMENTS

WO    WO 99/39468 A2    8/1999

* cited by examiner

*Primary Examiner*—Chi Pham
*Assistant Examiner*—Melanie Jagannathan
(74) *Attorney, Agent, or Firm*—Jenkins, Wilson, Taylor & Hunt, P.A.

(57) ABSTRACT

The inverse multiplexer device for inverse multiplexing of a broadband data stream received via a broadband data line (7) comprising measuring means (3a–6a) for measuring connection parameters of data transmission lines (3–6) connected in parallel to each other, selection means for selecting a subset of the data transmission lines (3–6) depending from the measured connection parameters and activation means (15a) for activating he selected subset of data transmission lines (3–6) to transmit the received data transmission stream over the selected subset of data transmission lines (3–6).

22 Claims, 4 Drawing Sheets

○ Active Connection Line

◍ Backup Connection Line

⊜ Inactive Connection Line

INVERSE MULTIPLEXER DEVICE

RELATED APPLICATIONS

This application is a continuation of PCT patent application number PCT/EP00/04651, filed May 22, 2000, the disclosure of which is incorporated herein by reference in its entirety.

TECHNICAL FIELD

The invention relates to an inverse multiplexer device for inverse multiplexing of a broadband data stream received on a broadband data line via a plurality of data transmission lines such as twisted-pair telephone copper lines.

BACKGROUND ART

Inverse multiplexing techniques can be used to support higher frequency bandwidth data transmission using several connections instead of a single broadband connection such as a fibre-optic cable or coaxial link. IMA-is an inverse multiplexing technique related to ATM E1/T1 connections. The inverse multiplexing protocol for ATM used by IMA does not relate to the data transfer medium. In the IMA-inverse multiplexing technique the data transfer quality of connection lines is not measured and evaluated.

As can be seen from FIG. 1 a plurality of DSL-connection lines is provided within a cable trunk. Each DSL-connection line consists of a twisted-pair telephone line made of copper. Environmental noise and signal disturbances created by other DSL-connection lines within the same cable trunk and the signal attenuation of the twisted-pair telephone line limit the amount of total bandwidth available over the aggregated connection lines. The cross-talk between the different DSL-connection lines reduces the possible operating distance for data transmission. Since in the IMA inverse multiplexing technique the quality of the data transmission line is not evaluated a data transmission line is activated which does not provide the best possible data transmission.

SUMMARY OF THE INVENTION

Accordingly it is an object of the present invention to provide an inverse multiplexer device and a method for inverse multiplexing which provides a high reliability of the data transmission through multiple data transmission lines.

The present invention provides an inverse multiplexer device for inverse multiplexing of broadband data stream received via a broadband data line comprising:

measuring means for measuring connection parameters of data transmission lines connected in parallel to each other,
selection means for selecting a subset of the data transmission line depending from the measured connection parameters, and
activation means for activating the selected subset of data transmission lines to transmit the received broadband data stream over the selected subset of data transmission lines.

In a preferred embodiment of the inverse multiplexer device according to the present invention the data transmission lines are DSL-connection lines.

The DSL-connection lines consists preferably of twisted-pair copper lines.

In a preferred embodiment the measuring means measures intra-connection parameters, cross-connection parameters and general-connection parameters of the data transmission line.

The intra-connection parameters measured by the measuring means are preferably the bit error rate BER, the signal to noise ratio SNR and the spectral line characteristic of each transmission line.

The cross-connection parameters measured by the measuring means are preferably the cross-talk magnitudes of cross-talk between all data transmission lines.

The general-connection parameters measured by the measuring means are preferably ambient noise magnitudes of ambient noise effecting the data transmission lines.

In a preferred embodiment the inverse multiplexing device according to the present invention comprises several DSL-modems wherein each modem is connected to one data transmission line.

Each modem measures preferably the connection parameters of the respective data transmission line.

In a further preferred embodiment of the inverse multiplexer device according to the present invention the data transmission lines connect the inverse multiplexer device to a demultiplexing device for demultiplexing the data stream transmitted by the inverse multiplexing device via the data transmission lines.

The broadband data line for transmitting the broadband data stream to the inverse multiplexer device is preferably a glass fibre, 100 base T or a coax cable.

The inverse multiplexing device according to the present invention is in a preferred embodiment connected via the data line to a chopper device for chopping the received broadband data stream into data cells of a predetermined size.

The demultiplexing device comprises in a preferred embodiment data reception buffers wherein each reception buffer is connected to a respective data transmission line for buffering data cells multiplexed by the inverse multiplexer device.

The demultiplexing device is connected in a preferred embodiment to a reconstructor for reordering the data cells using tags attached to each data cell generated by the chopper device.

The broadband data stream received by the inverse multiplexer device according to the present invention is preferably a PDH-data stream, SDH-data stream, a ATM-data stream, an Ethernet-data stream, a HDLC-data stream or a SONET-data stream.

In a further preferred embodiment of the inverse multiplexer device according to the present invention the selection means is a central processing unit CPU.

The central processing unit CPU is in a preferred embodiment integrated within the inverse multiplexer device according to the present invention.

The present invention further provide a multiplexer system for multiplexing a broadband data stream to transmit the broadband data stream via a plurality of data transmission lines connected in parallel to each other comprising the inverse multiplexing device and a demultiplexing device connected to the inverse multiplexing device through he plurality of data communication lines.

The present invention provides further a method for inverse multiplexing of broad band data streams, wherein the connection parameters of a plurality of data transmission lines are measured,
a subset of the plurality of data transmission lines is selected depending from the measured connection parameters,
and wherein the selected subset of data transmission lines is activated to transmit the broadband data stream via the selected subset of data transmission lines.

The data transmission lines are measured preferably subsequently.

In a preferred embodiment of the method for inverse multiplexing according to the present invention for each data transmission line intra-connection parameters, cross-connection parameters and general connection parameters are measured separately.

In a further preferred embodiment of the method for inverse multiplexing according to the present invention the measured connection parameters of all data transmission lines are used to generate a connection parameter matrix.

The data transmission lines which are not selected are preferably deactivated.

The measuring of the data transmission lines is in a preferred embodiment of the method according to the present invention repeated periodically.

In a still further embodiment of the method for inverse multiplexing according to the present invention a deactivated data transmission line is selected and activated to substitute an activated data transmission line when the connection parameters of the activated data transmission line indicate that the data transmission through this data transmission line has degraded.

Preferred embodiments of the inverse multiplexer device and the method for inverse multiplexing according to the present invention are described in detail with respect to the attached figures.

DETAILED DESCRIPTION OF THE INVENTION

Figure 1:
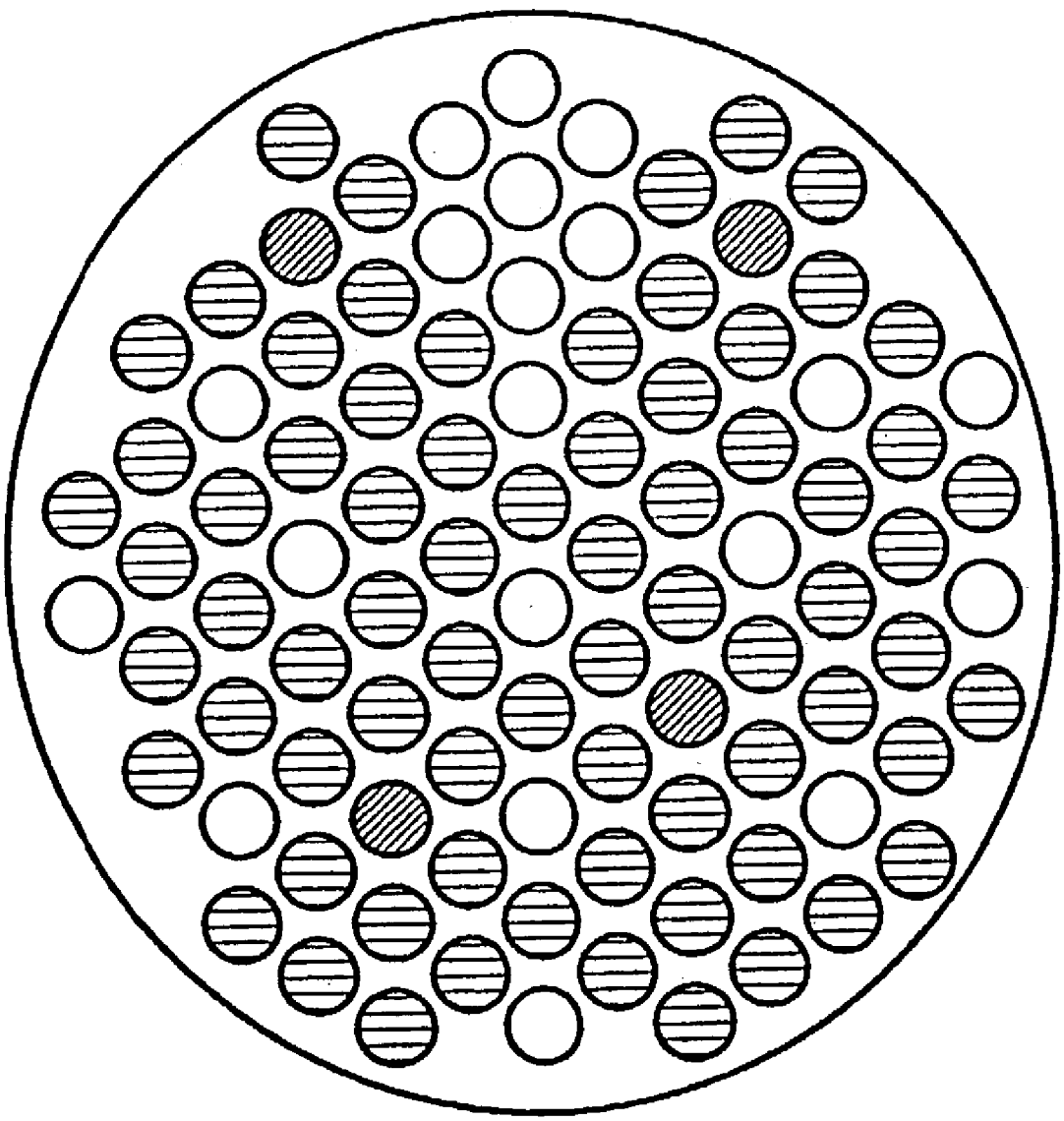
FIG. 1 shows a cross section through a cable trunk consisting of a plurality of data transmission lines to explain the problem underlying the present invention.
Figure 2:
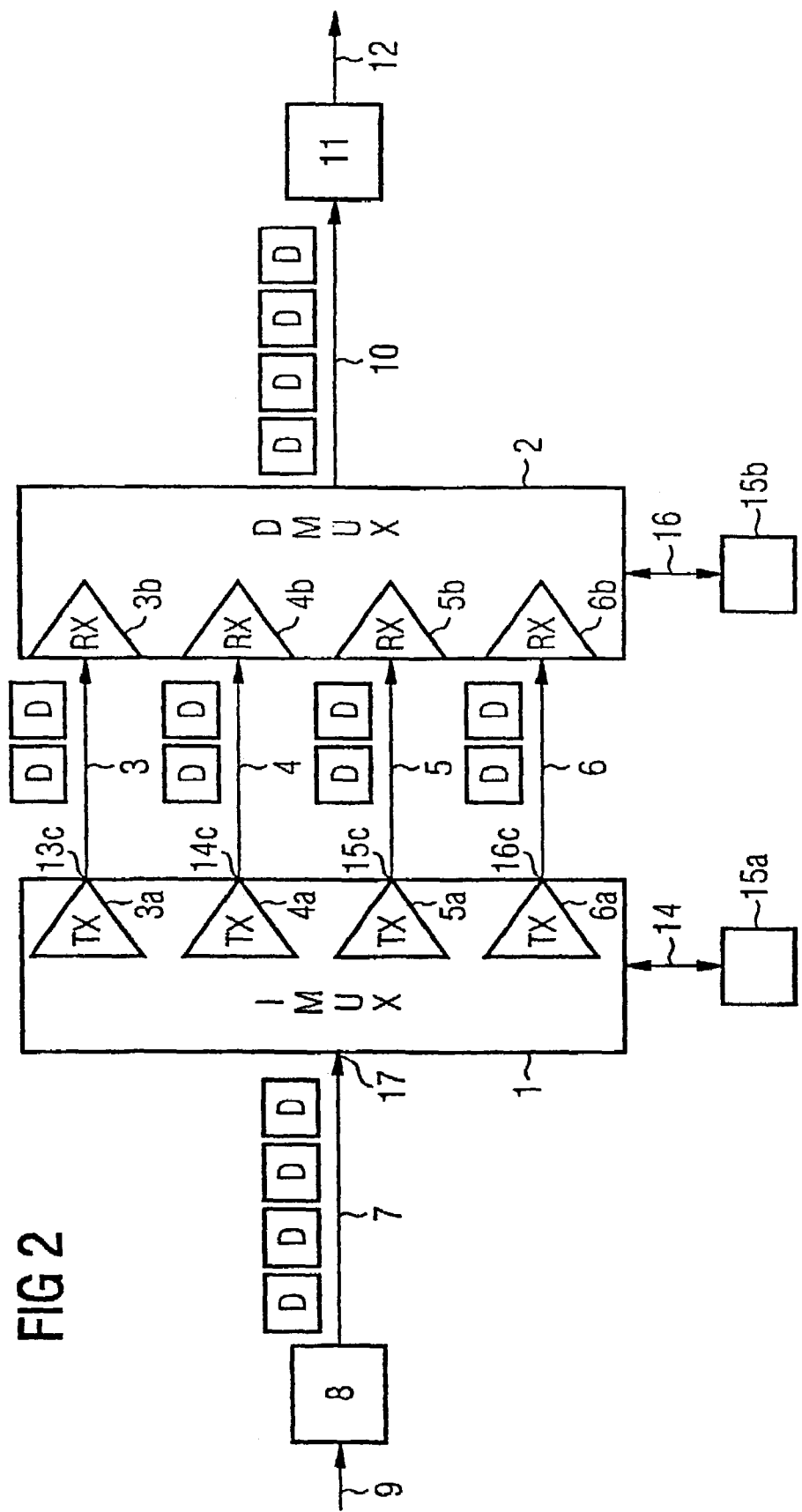
FIG. 2 shows one data path of a multiplexer system for multiplexing a broadband data stream via a plurality of data transmission lines connected in parallel to each other including an inverse multiplexer device IMUX according to the present invention.

In FIG. 2 one data path of a multiplexer system for multiplexing a broadband data stream includes an inverse multiplexing device 1 according to the present invention. The multiplexer system comprises two separated data paths for bidirectional data transmission. The inverse multiplexing device 1 is connected to a demultiplexing device 2 through a plurality of data transmission lines 3, 4, 5, 6 such as twisted-pair telephone wires made of copper. The inverse multiplexer device 1 includes several data transfer modems 3a, 4a, 5a, 6a to transmit data cells through data transmission lines 3, 4, 5, 6 to data modems 3b, 4b, 5b, 6b within the demultiplexing device 2. The inverse multiplexing device 1 according to the present invention is connected to a broadband data line 7 and receives a broadband data stream over the broadband data line 7 from a chopper device 8. The chopper device 8 receives a broadband data stream from a data source through a data line 9 and chops the broadband data stream received via a data line into data cells having a predetermined fixes size. The original data stream on line 9 is transmitted as payload inside the data cells D generated by the chopper device 8.

The inverse multiplexer device 1 according to the present invention receives the data cell D and performs an inverse multiplexing to distribute the received data cells for data transmission over a subset of data transmission lines which provide the highest reliability for data transmission.

The demultiplexing device 2 demultiplexes the data streams transmitted by the inverse multiplexer device 1 via the selected subset of transmission lines and sends the demultiplexed data cells through a data line 10 to a reconstructor 11 for reordering the data cells D.

The inverse multiplexing device 1 transmits the data cells D received from the chopper 8 through the selected active data transmission lines in known order. The demultiplexer 2 receives the data cells in a different order due to connection delay differences. Accordingly the order of the data cell D sent by demultiplexer 2 via line 10 differs from the order of data cells D received by the inverse multiplexing device via line 7. The reconstructor 11 reorders the data cell using tags attached to each data cell by the chopper device 8 during the generation of the data cell D. The reconstructor 11 reorders the data cell to get the original data stream received by the chopper device 8 via line 9. The data cells which has been reordered by the reconstructor 11 are output through the data line 12 for further data processing.

The inverse multiplexing device 1 and the demultiplexing device 2 are both connected through lines 14, 16 to a central processing units 15a, 15b for data management and multiplexing control.

Figure 3:
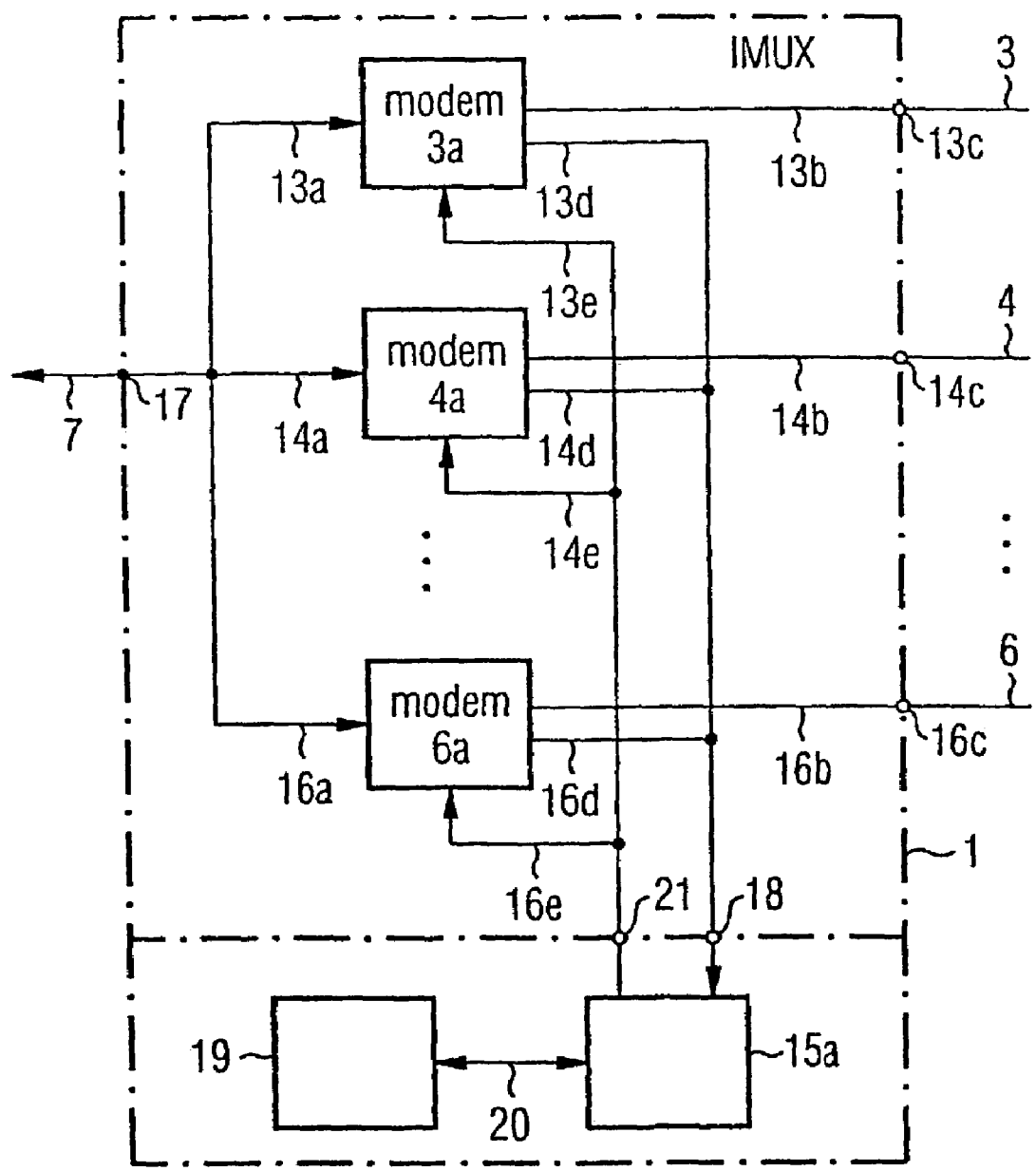
FIG. 3 shows a block diagram of an inverse multiplexer device IMUX according to the present invention.

FIG. 3 shows a block diagram of an inverse multiplexer device 1 according to the present invention. The inverse multiplexing device 1 includes several modems 3a, 4a, 5a, 6a each connected to a respective data transmission line 3 to 6. Each modem 3a–6a is connected through lines 13a–16a to a data transmission terminal 17 of the inverse multiplexing device 1. Further each modem 3a–6a is connected via lines 13b–16b to data transmission terminals 13c–16c for connecting the inverse multiplexing device 1 with the data transmission lines 3–6. Each modem 3a–6a measures the connection parameters of the respective data transmission lines 3–6 and transfers the measured connection parameters via respective parameter transfer lines 13d–16d to a parameter transfer terminal 18 of the inverse multiplexing device 1. The parameter transfer terminal 18 is connected to the central processing unit 15a which receives the measured connection parameters of all data transmission lines 3–6 and stores the connection parameters into storage means 19 connected to the central processing unit 15a via a line 20 for further evaluation of the connection parameters.

In a preferred embodiment of inverse multiplexing device 1 the central processing unit 15a and the storage means 19 for storing the measured connection parameters are integrated in the inverse multiplexing device 1.

Modems 3a–to 6a are preferably DSL-modems. Each DSL-modem 3a–6a measures intra-connection parameters, cross-connection parameters and general-connection parameters of the respective connection line 3–6.

The intra-connection parameters measured by the modem are the bit error rate BER, the signal-noise-ratio SNR and the spectral line characteristic of the data transmission line 3–6.

The cross-connection parameters measured by a modem 3a–6a are the cross-talk magnitudes of cross talk between the respective connection line and the other remaining connection lines.

As general-connection parameters the modems 3a–6a measure the ambient noise magnitudes of ambient noise effecting the respective connection line.

The measured connection parameters of all connection lines 3–6 are stored by the central processing unit 15 in storage means 19. On the basis of the stored connection lines parameters a parameter matrix P is generated by the central processing unit 15a before the selection of an optimal subset of data transmission lines 3–6.

$$P = \begin{bmatrix} A_{1,1} & A_{1,2} & & & \\ A_{2,1} & A_{2,2} & & & \\ & & \ddots & & \\ & & & & A_{N,N-1} \\ & & & A_{N-1,N} & A_{N,N} \end{bmatrix}$$

Wherein $A_{ii}$ are the intra channel quality parameters based on bit error rate BER, signal to noise ratio SNR, wherein $A_{ij}$ are cross channel quality parameters based on cross talk between different data transmission lines, and wherein N is the number of all available data transmission lines connecting the inverse multiplexing device 1 to the demultiplexing device 2 as shown in FIG. 2.

In the example shown in FIG. 2 the number N of available data connection lines is four. The central processing unit evaluates the parameter matrix P and selects a subset of K data transmission lines from a total of N available connection lines, wherein the subset of K data connection lines selected by the central processing unit provides for the highest reliability in data transmission between the inverse multiplexing device 1 and the demultiplexing device 2.

After selection of the best subset of data transmission lines the central processing unit 15a activates the respective modems 3a–6a via control lines 13e–16e connected to a control terminal 21 for data transmission. The modems of the remaining not selected data transmission line are deactivated. During the selection process the central processing unit 15a scores all DSL-connections from the best data transmission connection to the worst data transmission connection line. The best K data transmission line needed to transport the required bandwidth are turned on. The rest of the data transmission lines are turned off. The process of data line quality measurement takes place in all active data transmission lines K. In case of a data line failure due to disconnection or in case of a very high bit error rate of an activated data transmission line this data transmission line is turned off by deactivating the respective modem and the best next available data transmission line is turned on to substitute the defect data transmission line.

The measurement of the connection parameters of the data transmission line is repeated periodically. Switching occurs when one of the data transmission lines is disconnected or has a high bit error rate BER. Using a set of N data connection lines with a theoretical bandwidth which is wider than the requested bandwidth for data transmission and selecting the best subset of data connection line provides a high fault tolerance and better connection quality in terms of bit error rate BER or signal to noise ratio SNR. The selection of the best subset of data connection lines is performed automatically and the dynamically switching between all available data connection lines provides best aggregated data transmission connection between the inverse multiplexing device 1 and the demultiplexing device 2.

In the example shown in FIG. 2 the central processing unit 15a selects as an optimal subset of data transmission line the data transmission line 3, 4, 5 whereas the data transmission line 6 is switched off. In case that, e.g. data transmission line 3 is disconnected data transmission line 6 will be switched on by the central processing unit 15 to substitute the disconnected data transmission line 3. The data transmission lines which are not switched on by the central processing unit 15a provide for a redundancy in the data transmission. In case that a higher frequency bandwidth is necessary for data transmission back-up data transmission lines can be switched on to provide for the necessary total frequency bandwidth.

The data connection can be based on any DSL-technology such as HDSL, SDSL, ADSL or VDSL. The broadband data stream received by the inverse multiplexing device 1 through broadband data line 7 can be any kind of data stream such as PDH-data stream, SDH-data stream, ATM-data stream, Ethernet-data stream, HDLC-data stream or a SONET-data stream. The multiplexing system shown in FIG. 2 can be used both in the upstream and in the downstream data transfer direction when using DSL-technology. The central processing units 15a, 15b on both sides handle the selection process and the redundant line switching process. The inverse multiplexing device 1 guarantees a high bandwidth, full duplex data bit stream from point to point via the best K data connection lines with an aggregated bandwidth. The other N-K data connection lines are used as back-up links for the system. The detection of a fault data connection line in terms of bit error ratio BER or signal to noise ratio SNR will lead to hot swapping of the faulty data connection line with the best available back-up link.

The inverse multiplexing device 1 according to the present invention can be powered locally from a powers source or can be powered remotely over the connections lines.

The twister-pair data connection lines can connect a central office exchange to a cabinet or curb, a curb to a basement or an end user or two rooms inside the same building. The inverse multiplexing device 1 reduces the costs for high-speed data transmission to a wide extend because conventional data transmission lines can be used for a broadband data transmission. The transferred data are transmitted over the same connection medium such as cable trunk thus introducing a very small time delay. The multiplexer system shown in FIG. 2 supplies high bandwidth connection without the need of installing an expensive new fibre optic connection. Existing copper based twisted pairs are used instead.

Figure 4:
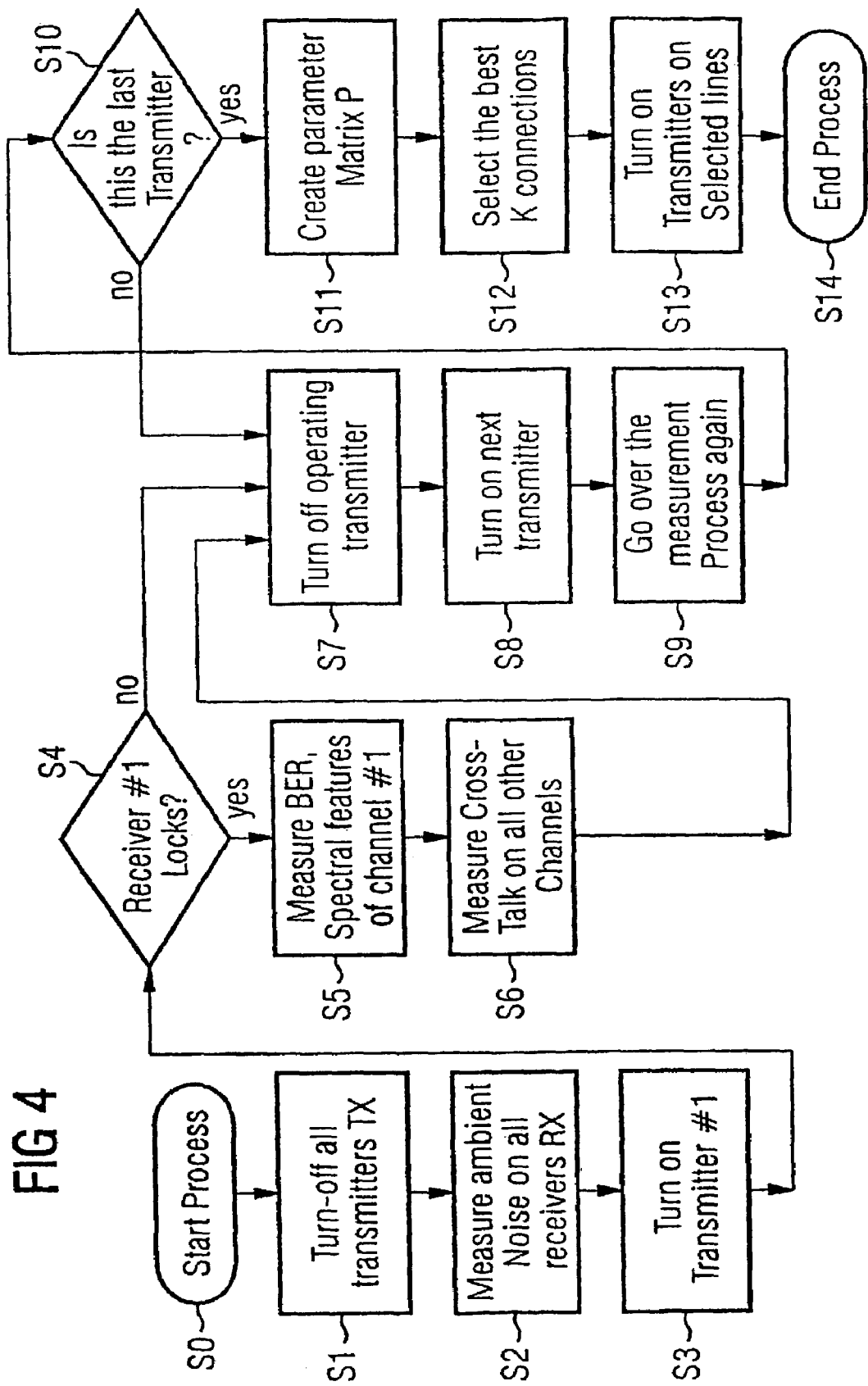
FIG. 4 is flow chart of a preferred embodiment of the method for inverse multiplexing of a broadband data stream according to the present invention.

FIG. 4 shows a preferred embodiment for a method for inverse multiplexing of a broad band data stream according to the present invention.

The process starts with step 0 and in step 1 all transmitters $T_x$, i.e. modems 3a–6a within the inverse multiplexing device are turned off.

In step S2 the ambient noise on all receivers $R_x$, i.e. modems 3b–6b within the demultiplexing device 2 is measured.

In step S3 the first transmitter, i.e. modem 3a within inverse multiplexing device 1 is turned on.

In step S4 it is checked whether the receiver 1, i.e. modem 3b within the demultiplexing device 2, is locked to the transmitting device 3a.

In case that modem 3b within the demultiplexing device 2 is locked to respective transmitting device 3a the bit error ratio BER and the spectral line characteristic of the data transmission line 3 is measured as intra-connection parameters of the data transmission line within step S5.

In a further measuring step S6 the cross-talk between the data communication line 3 and the remaining other communication lines 4–6 is measured.

The process continues with step S7 wherein all operating transmitting devices are turned off again.

Then in step S8 the next transmitting device such as modem 4a within the inverse multiplexing device 1 is turned on and the measuring steps S4 to S6 are repeated. This in done for all transmitting devices 3a–6a of the inverse multiplexing device 1 until in step 10 it is detected that the connection parameters of the last data transmission line have been measured.

After all connection parameters have been detected a parameter matrix P is generated in step S11.

The central processing unit 15a selects the best K data connection lines on the basis of the parameter matrix P in step S12.

In step S13 the modems of the selected data transmission lines are activated by the central processing-unit 15 for data transmission.

The process shown in FIG. 4 it stops in step S15.

The measuring of the data transmission lines is repeated periodically. A deactivated data transmission line is selected and activated to substitute an activated data transmission line when the connection parameters of the activated data transmission line indicate that the data transmission through this data transmission line has degraded.

The invention claimed is:

1. An inverse multiplexer device for inverse multiplexing of a broadband data stream received via a broadband data line, the inverse multiplexer device comprising:
   (a) measuring means for measuring connection parameters of data transmission lines connected in parallel to each other;
   (b) selection means for selecting a subset of the data transmission lines depending from the measured connection parameters;
   (c) activation means for activating the selected subset of data transmission lines to transmit the received data transmission stream over the selected subset of data transmission lines; and
   (d) a plurality of DSL-modems, wherein each modem is connected to one respective data transmission line, wherein modems connected to the data transmission lines are activated if the data transmission lines to which the modems are connected belong to the selected subset of the data transmission lines, and wherein the modems connected to the data transmission lines are deactivated if the data transmission lines to which the modems are connected do not belong to the selected subset of the data transmission lines.

2. The inverse multiplexer device according to claim 1, wherein the data transmission lines are DSL-connection lines.

3. The inverse multiplexer device according to claim 2, wherein the DSL-connection lines are twisted-pair telephone copper lines.

4. The inverse multiplexer device according to claim 1, wherein the measuring means measure intra-connection parameters, cross-connection parameters and general-connection parameters.

5. The inverse multiplexing device according to claim 4, wherein the intra-connection parameters measured by the measuring means are bit error rates (BER), signal to noise ratio (SNR) and spectral line characteristic of each data transmission lines.

6. The inverse multiplexer device according to claim 4, wherein the cross-connection parameters measured by the measuring means are cross talk magnitudes of cross talk between a respective data transmission line and the remaining other data transmission lines.

7. The inverse multiplexing device according to claim 4, wherein the general-connection parameters are ambient noise magnitudes of ambient noise effecting the data transmission via the data transmission line.

8. The inverse multiplexing device according to claim 1, wherein a DSL-modem measures the connection parameters of the respective data transmission line.

9. The inverse multiplexing device according to claim 1, wherein the data transmission lines connect the inverse multiplexing device with a demultiplexting device for demultiplexing the data streams transmitted by the inverse multiplexing device via the data transmission lines.

10. The inverse multiplexing device according to claim 1, wherein the broadband data line is a glass fiber, 100 base T or coax cable.

11. The inverse multiplexing device according to claim 9, wherein the inverse multiplexing device is connected via the broadband data line to a chopper device for chopping the received broadband data stream into data cells D of a predetermined size.

12. The inverse multiplexing device according to claim 9, wherein the demultiplexing device comprises reception data buffers, wherein each buffer is connected to a respective data transmission line for buffering data cells D multiplexed by the inverse multiplexing device.

13. The inverse multiplexing device according to claim 11, wherein the demultiplexing device is connected to a reconstructor for reordering the data cells D using tags attached to each data cell generated by the chopper device.

14. The inverse multiplexing device according to claim 1, wherein the broadband data stream is a PDH-data stream, a SDH-data stream, an ATM-data stream, an ETHERNET-data stream, a HDLC-data stream or a SONET-data stream.

15. The inverse multiplexing device according to claim 1, wherein the selection means and the activation means are formed by a central processing unit integrated within the inverse multiplexing device.

16. Multiplexing system for multiplexing a broadband data stream to transmit the data stream via a plurality of data transmission lines connected in parallel to each other comprising the inverse multiplexing device according to claim 1 and a demultiplexing device connected to the inverse multiplexing device through the plurality of data transmission lines.

17. A method for inverse multiplexing of a broadband data stream, the method comprising:
   (a) measuring the connection parameters of a plurality of data transmission lines;
   (b) selecting a subset of the plurality of data transmission lines depending from the measured connection parameters;
   (c) activating the selected subset of data transmission lines to transmit the broadband data stream via the selected subset of data transmission lines;

(d) deactivating the data transmission lines that are not selected;
(e) activating DSL-modems connected to the data transmission lines if the data transmission lines to which the modems are connected belong to the selected subset of the data transmission lines; and
(f) deactivating DSL-modems connected to the data transmission lines if the data transmission lines to which the modems are connected do not belong to the selected subset of the data transmission lines.

18. The method according to claim 17, wherein all data transmission lines are measured subsequently.

19. The method according to claim 17, wherein for each data transmission line intra-connection parameters, cross-connection parameters and general connection parameters are measured.

20. The method according to claim 17, wherein a connection parameter matrix P is generated depending from the measured connection parameters of all data transmission lines.

21. The method for inverse multiplexing according to claim 17, wherein the measuring of the data transmission lines is repeated periodically.

22. The method for inverse multiplexing according to claim 17, wherein a deactivated data transmission line is selected and activated to substitute an activated data transmission line, when the connection parameters of the activated data transmission lines indicated that the data transmission through this data transmission line has degraded.

* * * * *